US007582242B2

(12) United States Patent
Kolanus

(10) Patent No.: US 7,582,242 B2
(45) Date of Patent: Sep. 1, 2009

(54) METHOD OF FORMING AN AEROSOL VALVE ACTUATOR

(75) Inventor: Gunter Kolanus, Niedernhausen (DE)

(73) Assignee: Precision Valve Corporation, Yonkers, NY (US)

( * ) Notice: Subject to any disclaimer, the term of this patent is extended or adjusted under 35 U.S.C. 154(b) by 555 days.

(21) Appl. No.: 11/331,970

(22) Filed: Jan. 13, 2006

(65) Prior Publication Data

US 2006/0151547 A1 Jul. 13, 2006

Related U.S. Application Data

(62) Division of application No. 10/738,855, filed on Dec. 17, 2003, now Pat. No. 7,104,424.

(51) Int. Cl.
*B29C 45/14* (2006.01)
*B29C 70/74* (2006.01)

(52) U.S. Cl. ........................ 264/250; 264/255; 264/267

(58) Field of Classification Search ........................ None
See application file for complete search history.

(56) References Cited

U.S. PATENT DOCUMENTS 3,443,005 A * 5/1969 Braun ........................ 264/245
3,739,952 A 6/1973 Chafitz et al.
3,860,149 A 1/1975 Hagianis
3,967,760 A 7/1976 Marcon
3,991,916 A 11/1976 Del Bon
5,027,982 A 7/1991 Demarest
5,105,988 A 4/1992 Knickerbocker
5,242,087 A 9/1993 Keldenich et al.
5,360,145 A 11/1994 Gueret
5,732,855 A 3/1998 van der Heijden
5,914,085 A * 6/1999 Zimmerhackel ....... 264/328.16

(Continued)

FOREIGN PATENT DOCUMENTS

EP 0 461 894 12/1991
FR 2 839 952 11/2003
WO WO 02 48004 6/2002

OTHER PUBLICATIONS

Supplementary European Search Report corresponding to European Patent No. EP 04 81 4664 dated Jul. 29, 2008.

(Continued)

*Primary Examiner*—Edmund H. Lee
(74) *Attorney, Agent, or Firm*—Ohlandt, Greeley, Ruggiero & Perle, LLP

(57) ABSTRACT

An aerosol valve actuator with a valve stem engaging portion, product dispensing opening, and flexible and expandable product conduit between the engaging portion and dispensing opening. The product conduit is molded at least in part of a first expandable flexible plastic material softer than a second plastic material of the remainder of the actuator. The remainder of the actuator is first molded, followed by molding the first plastic material to form at least a part of the product conduit. After the actuator has been actuated to dispense a foaming product and actuation ceases, the post-foaming product expands within the product conduit since the conduit expands to absorb the product expansion. Actuator cap and base product dispensing side openings align only during valve actuation. Base inwardly flexible members and cap internal ramps bias the cap upwardly when actuation ceases. Base upper portion telescopes in base lower portion during actuation.

4 Claims, 9 Drawing Sheets

U.S. PATENT DOCUMENTS

| | | | | |
|---|---|---|---|---|
| 6,158,625 | A | 12/2000 | Siegel et al. | |
| 6,217,808 | B1 * | 4/2001 | Lacout | 264/255 |
| 6,264,067 | B1 | 7/2001 | Lasserre | |
| 6,497,346 | B1 * | 12/2002 | Dubois et al. | 222/494 |
| 2004/0112924 | A1 | 6/2004 | Albisetti | |

OTHER PUBLICATIONS

International Search Report to the corresponding International Patent Application No. PCT/US04/42513 dated Jan. 23, 2007.

* cited by examiner

METHOD OF FORMING AN AEROSOL VALVE ACTUATOR

This application is a division of U.S. application Ser. No. 10/738,855 filed Dec. 17, 2003, which issued as U.S. Pat. No. 7,104,424 on Sep. 12, 2006. Applicant claims the benefit of the prior U.S. application.

FIELD OF THE INVENTION

The present invention relates to aerosol valve actuators, and more particularly to such actuators of the enclosure type for use with products that expand and foam when first exposed to air.

BACKGROUND OF THE INVENTION

Aerosol valve actuators of the enclosure type generally have the enclosure base mounted onto the product container and/or onto the mounting cup of the aerosol valve on the container. Finger actuatable means on the actuator are operationally associated with the aerosol valve stem for actuating the aerosol valve and dispensing the product. The finger actuatable means may be for example a hinged finger pad integrally molded as one piece with the remainder of the actuator and extending into an opening in the upper portion of the actuator; or, may be a separate cap member on a base member, wherein the top of the cap member may be manually pushed by a finger downwardly with respect to the base to actuate the aerosol valve.

Certain products dispensed through an aerosol valve foam and expand when exposed to air, for example shaving creams and shaving gels. When actuation of the aerosol actuator dispensing these products first ceases, product remains in the product conduit inside the actuator between the aerosol valve stem and the actuator outlet. These products continue to foam and expand in the product conduit so that a small amount of foamed product exits the actuator outlet after actuation ceases. This is not only an aesthetic issue, but is also unsanitary, messy, and generally requires wiping away the foamed product outside the outlet before the next dispensing of product.

Various attempts have been made to solve the above-described “after-foaming” or “post-foaming” problem inherent in the dispensing of such products. These attempts have included providing means to block the aerosol outlet after actuation or providing space inside the actuator to absorb the foaming expansion of the product after actuation ceases. Such means have not been fully satisfactory, can be overly complex and can result in the accumulation of post-foaming product within the actuator body. Among the above attempted solutions have been the use of an actuator cap with a product dispensing opening that aligns with a product dispensing opening in the actuator base on actuation, and misaligns with the product dispensing opening in the base when actuation ceases.

SUMMARY OF THE INVENTION

The present invention is intended to provide an aerosol valve actuator that avoids the post-foaming problem, which is strongly constructed, easily manufactured and assembled, and which functions reliably and efficiently. In particular, no unsightly, unsanitary and messy product occurs outside the actuator outlet after actuation ceases, and no post-foaming product accumulates within the actuator in a manner that is not removed on the next actuation.

The aerosol valve actuator of the present invention includes an enclosure, an aerosol valve stem engaging portion, a product dispensing opening, and a flexible and expandable product conduit extending between said valve stem engaging portion and said product dispensing opening. The product conduit is molded at least in part of a first expandable and flexible plastic material which is softer than a second plastic material from which the remainder of the actuator is molded. The remainder of the actuator is first molded, followed by molding the first plastic material to form at least a part of the product conduit. The second, harder, plastic material may be polypropylene, and the first plastic material may be a thermoplastic elastomer such as Santoprene. In operation, after the actuator has been actuated to dispense a foaming product and actuation ceases, the post-foaming product expands within rather than outside the product conduit since the conduit itself expands to absorb the product expansion. Thereafter, when the next actuation occurs, the post-foaming product in the product conduit merely exits the actuator outlet as it is forced out by the product in the container being dispensed.

The actuator of the present invention may comprise a two-piece actuator having a cap and a base. The base includes a side wall with a product dispensing opening, a centrally located tube that is engageable at its bottom with the aerosol valve stem, and the at least in part flexible and expandable product conduit extending between the bottom of the tube and the base side wall product dispensing opening. The cap has a top wall for finger engagement, and a side wall with a product dispensing opening therein. The cap in its non-actuated position is in its up position, with its product dispensing opening misaligned with the product dispensing opening in the base, and with the side wall of the cap blocking the product dispensing opening in the base. When the cap is manually pressed, it slides downwardly on the base to a position where the product dispensing openings in the cap and base are aligned for product dispensing. After product dispensing, the cap returns to its upper position where it blocks the base product dispensing opening. The post foaming of the product in the product conduit cannot exit the actuator, and the foaming expansion in the conduit is taken up by expansion of the product conduit itself.

The base of the actuator includes a side wall with a plurality of inwardly flexible members. The cap has a plurality of internal ramps. When the cap slides downward on the base, the cap ramps flex the base side wall flexible members inwardly. After actuation ceases, the base flexible members act against the ramps to bias the cap to slide upwardly on the base to its non-actuating position.

The base is comprised of an upper portion and a lower portion connected together by one or more flexible tab members that allow the upper portion to be depressed in relation to the lower portion to actuate the aerosol valve. The valve stem engaging central tube is located in the upper portion of the base. When the cap is manually depressed to slide downwardly on the upper portion of the base, it reaches the position where the cap and base product dispensing openings are aligned. When the cap is further depressed, it forces the upper portion of the base to telescope within the lower portion of the base, at which point the central tube of the upper portion actuates the valve stem to initiate product dispensing. After product dispensing ceases, the aerosol valve spring pushes the upper portion of the base upwardly to its non-actuating position.

The assembly of the base and cap is facilitated by a number of features. The base has a top surface with a plurality of openings within which a plurality of protrusions extending downwardly from the underside of the cap wall extend and lock into (via enlargements on the end of the protuberances). Said base and cap respectively also have interfitting side wall slots and protrusions to properly align and stabilize the cap and base with respect to each other upon assembly.

The product conduit in the base may comprise a tubular portion of the softer expandable plastic that extends between the base side wall product dispensing opening and the top of the base centrally located tube, and a wall portion of the softer plastic extending down said centrally located tube to form with the inner tube wall a further conduit portion.

Other features and advantages of the present invention will be apparent from the following description, drawings and claims.

DETAILED DESCRIPTION OF EMBODIMENT

Figure 1:
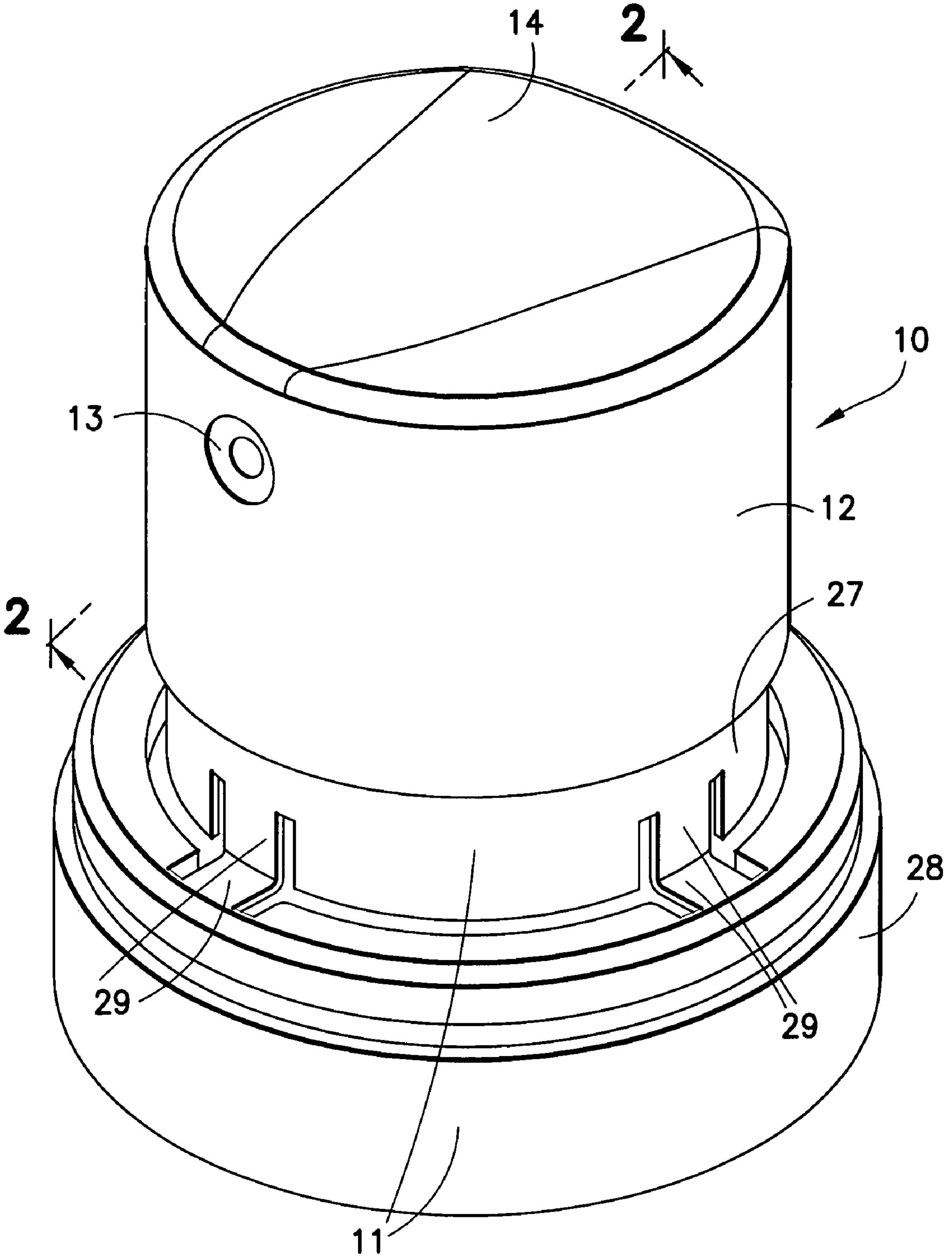
FIG. 1 is a perspective view of an assembled aerosol valve actuator of the present invention.

Referring to FIG. 1, aerosol valve actuator 10 is shown assembled from molded plastic base 11 and cap 12. Cap 12 has a product dispensing opening 13 in its side wall, and a top surface 14 for finger actuation of the actuator by pressing downward.

FIGS. 2-5 are axial cross-sectional views of the assembled actuator of FIG. 1 in various operational positions of the cap 12 in relation to the base 11. Base 11 is shown mounted on the mounting cup 15 of an aerosol container 16 by base flange 17 that snaps under edge 18 of the mounting cup (see FIG. 2). Mounting cup 15 supports an aerosol valve with aerosol valve stem 19 in known fashion.

Figure 6:
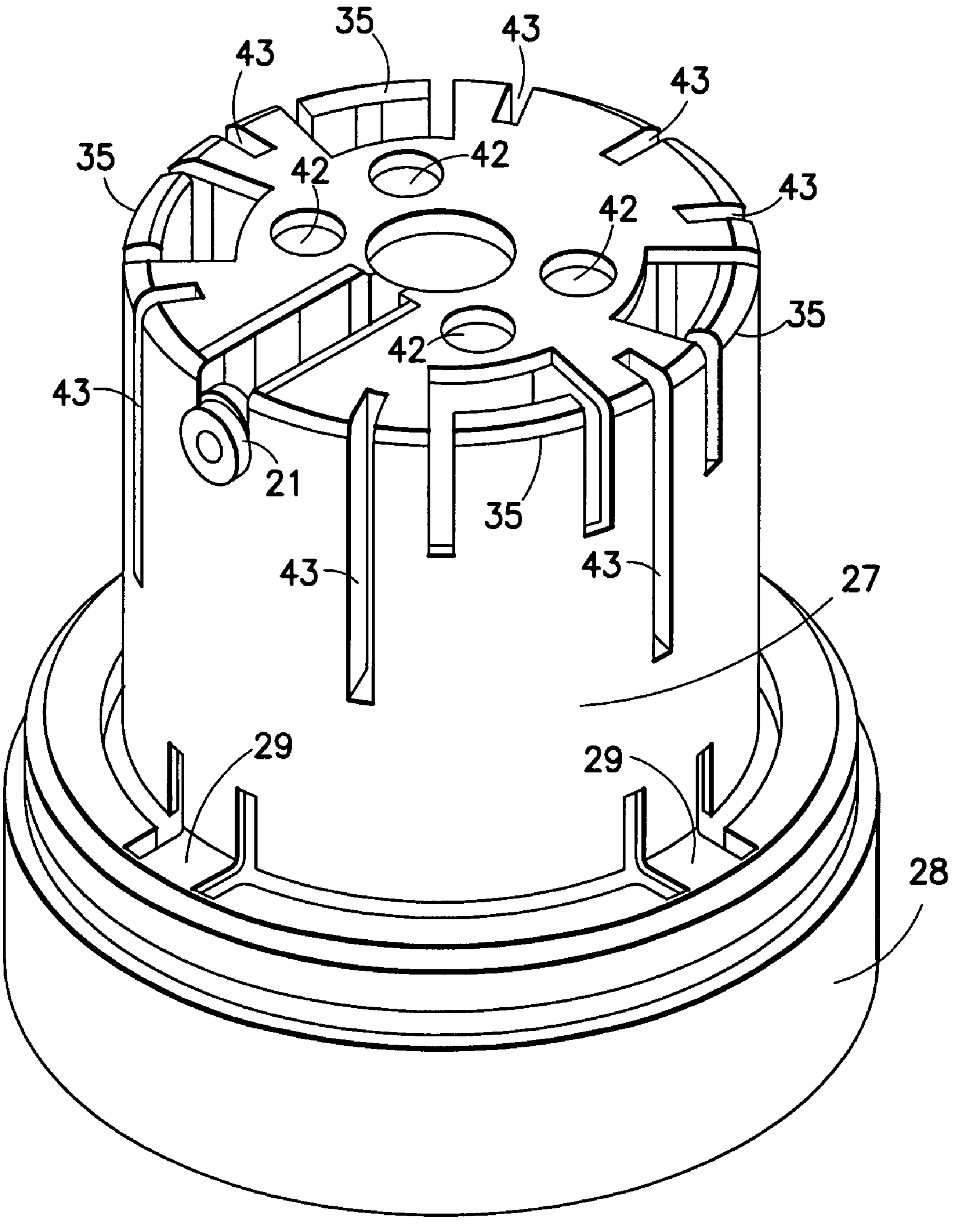
FIG. 6 is a perspective view of the base of the aerosol valve actuator of the present invention.
Figure 7:
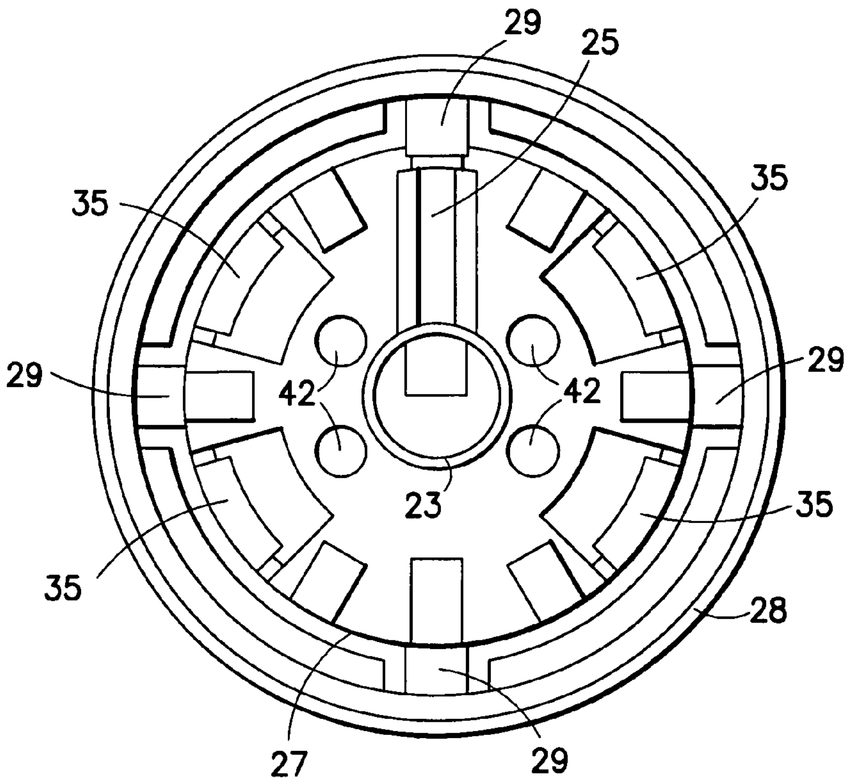
FIG. 7 is a bottom plan view of the base of the actuator of FIG. 6.
Figure 8:
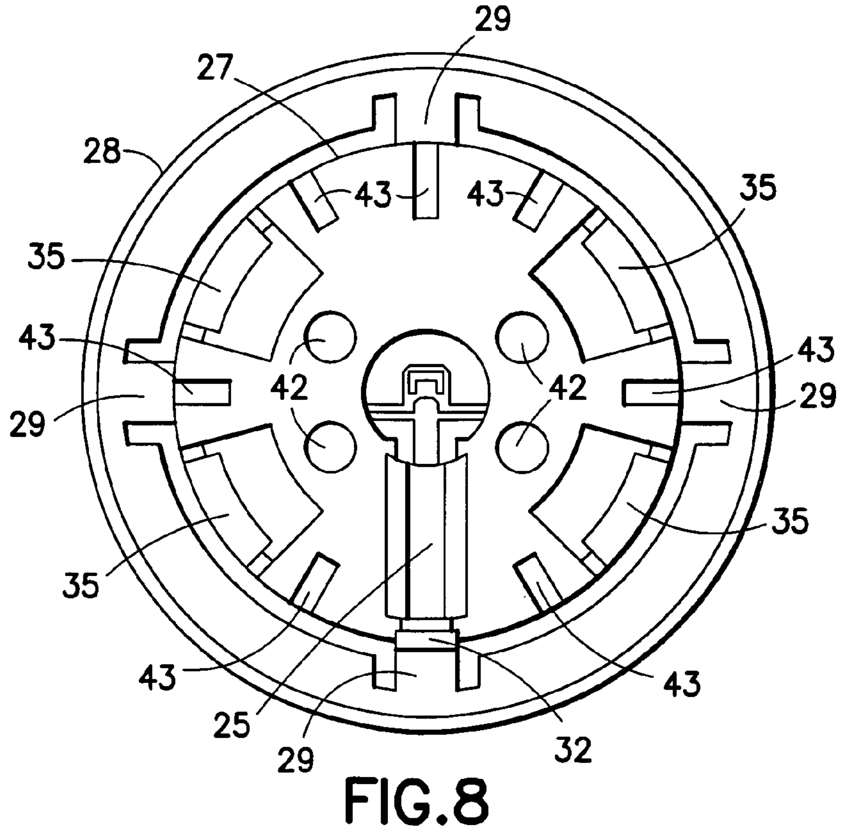
FIG. 8 is a top plan view of the base of the actuator of FIG. 6.
Figure 9:
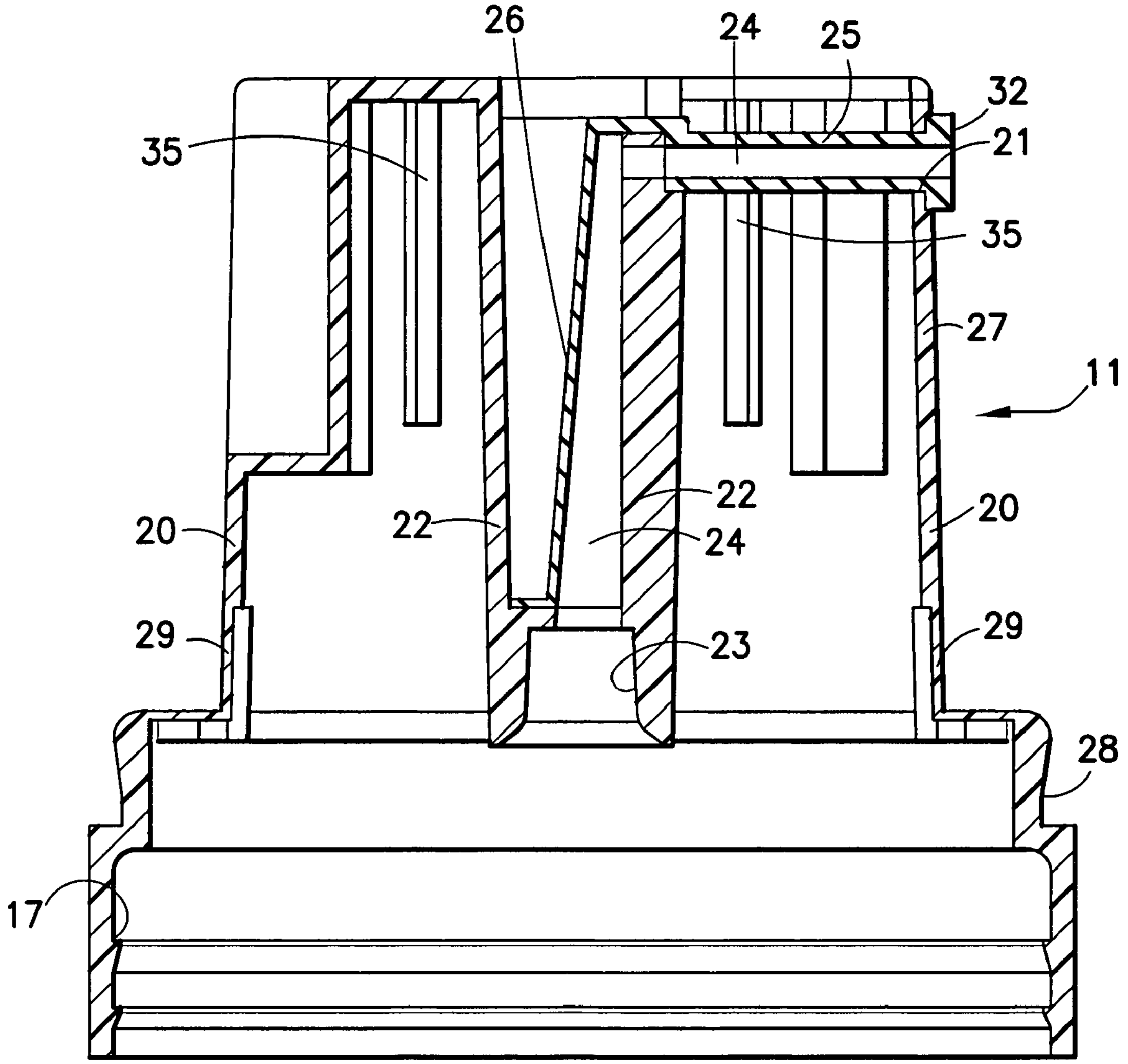
FIG. 9 is an enlarged axial cross-sectional view of the base of the actuator of FIG. 6.

Base 11 is shown by itself in perspective in FIG. 6 and in axial cross-section in FIG. 9. Referring to FIG. 9, base 11 has side wall 20 with a product dispensing opening 21 therein. Base 11 includes a centrally located tube 22 with bottom region 23 for engagement with the aerosol valve stem 19 (see FIG. 2). Extending between bottom region 23 and product dispensing opening 21 is product conduit 24. Product conduit 24 is at least in part flexible and expandable, and as shown is comprised of a softer thermoplastic elastomer (TPE) such as Santopreme. The remainder of base 11 is comprised of a harder plastic such as polypropylene. The horizontal portion of conduit 24 leading to opening 21 is a tubular TPE member 25 extending through opening 21, and the essentially vertical portion of conduit 24 is formed of a TPE curvilinear member 26 that meets and together with the inner side wall of centrally located tube 22 defines vertical portion 24. Base 11 is initially injection molded of the harder plastic in a two-component molding machine, followed by the softer expandable plastic of conduit 24 being overmolded onto base 11. Base 11 also is comprised of upper portion 27 and lower portion 28 which are connected together by a plurality of thin flexible tab hinges 29 (see FIGS. 1,6).

Now referring back to FIGS. 2-5, FIG. 2 illustrates base 11 and cap 12 in the assembled, non-actuated condition. Cap 12 is in its upper position, and cap product dispensing opening 13 is above and unaligned with base product dispensing opening 21. The inner surface 30 of cap wall 31 abuts against and seals the open protruding end 32 (see FIG. 9) of product conduit tubular TPE member 25 in base 11.

Figure 2:
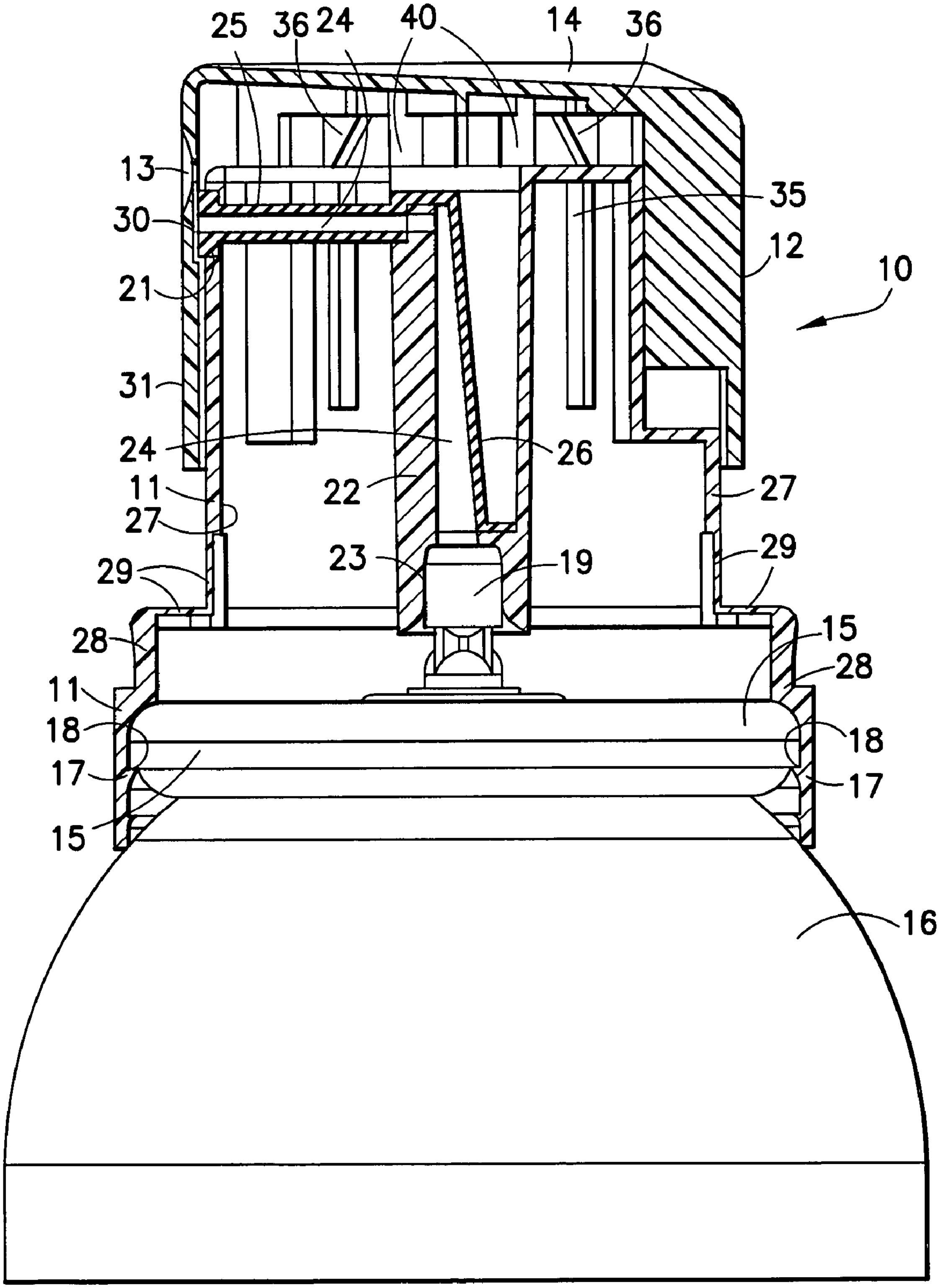
FIG. 2 is an axial cross-sectional view of the assembled actuator of FIG. 1 before it has been actuated.
Figure 3:
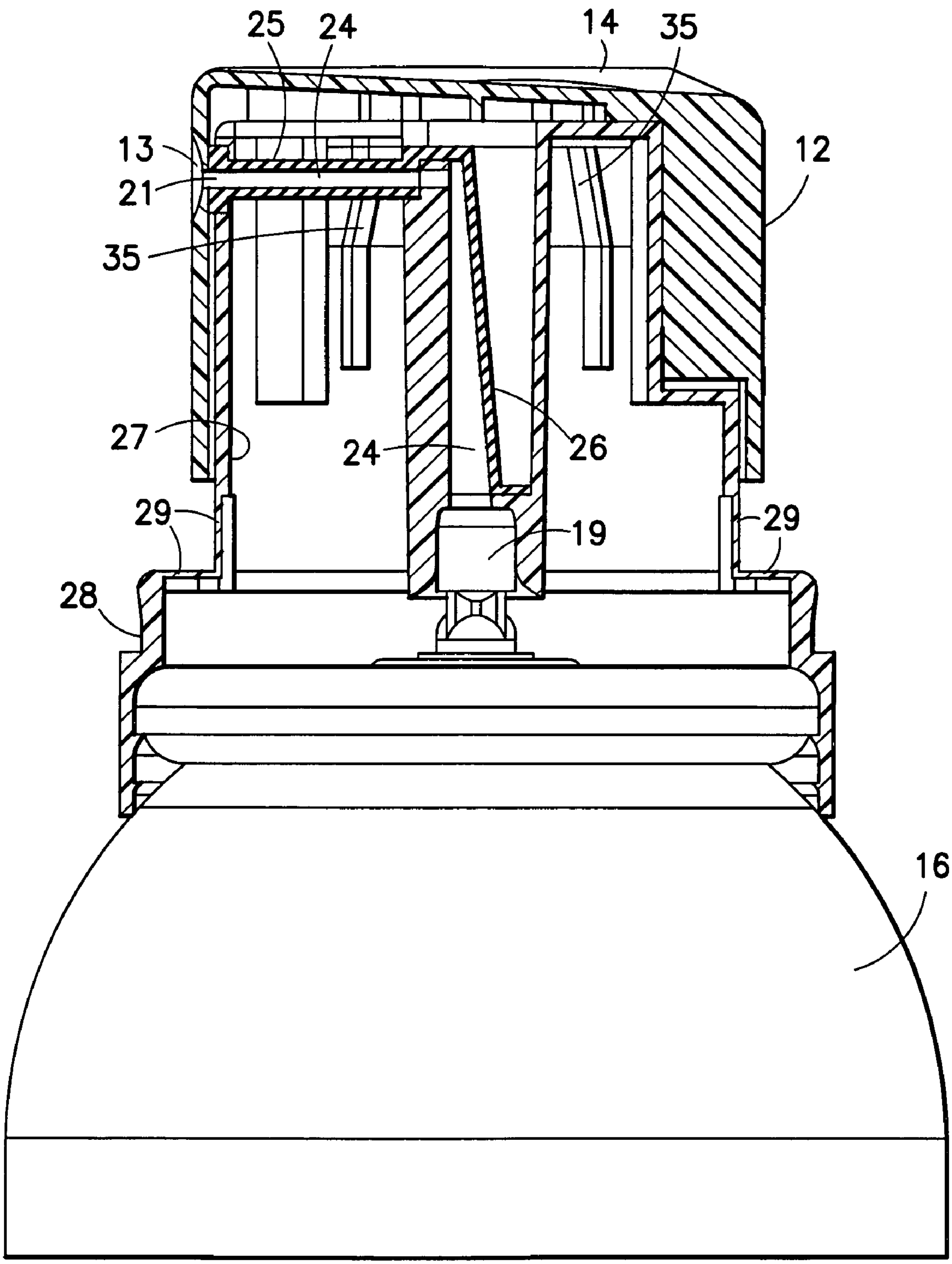
FIG. 3 is an axial cross-sectional view corresponding to FIG. 2 and showing the assembled actuator in its initial actuation phase of opening the dispensing orifices.

When the top surface 14 of cap 12 is initially pressed downwardly by the user's finger, cap 12 slides down base 11 to the position shown in FIG. 3 where the respective product dispensing openings 13 and 21 of the cap and base are aligned with one another preparatory to product dispensing from container 16. Tab hinges 29 remain in the same position as shown in FIG. 2. Aerosol valve stem 19 has not yet been actuated.

Figure 4:
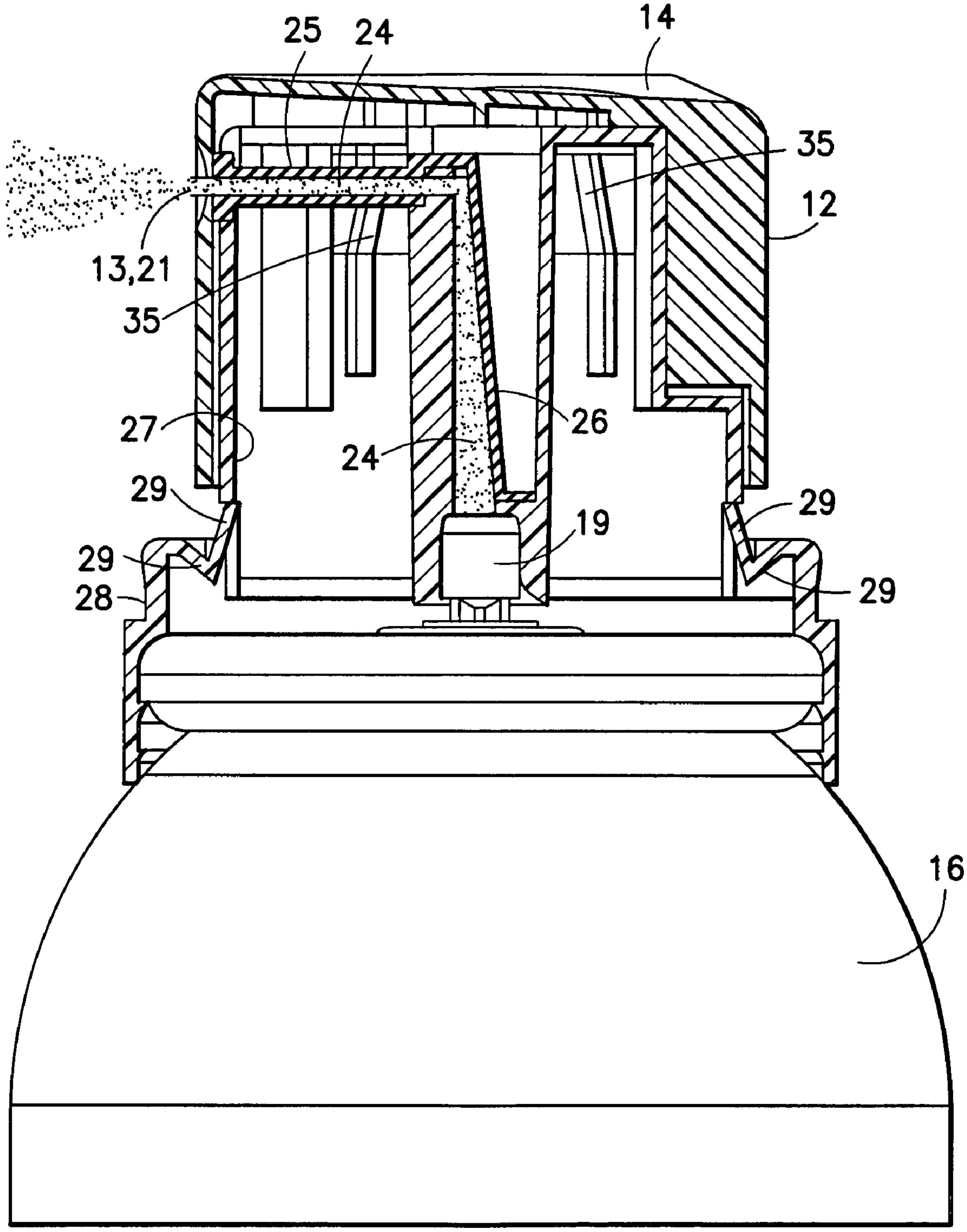
FIG. 4 is an axial cross-sectional view corresponding to FIG. 2 and showing the assembled actuator in its product dispensing phase.

Further depression of the user's finger on top surface 14 of cap 12 will result in cap 12 continuing to slide downwardly on base 11. Aerosol valve stem 19 is now actuated as base upper portion 27 is telescoped into the central opening in base lower portion 28 through the action of cap 12 onto base 11, tab hinges 29 are snapped to the position shown in FIG. 4, and the respective cap and base product dispensing opening 13,21 remain aligned for product dispensing. As can be seen in FIG. 4, the product in container 16 now flows upward and outward through product conduit 24, and out aligned product dispensing openings 13,21.

Figure 5:
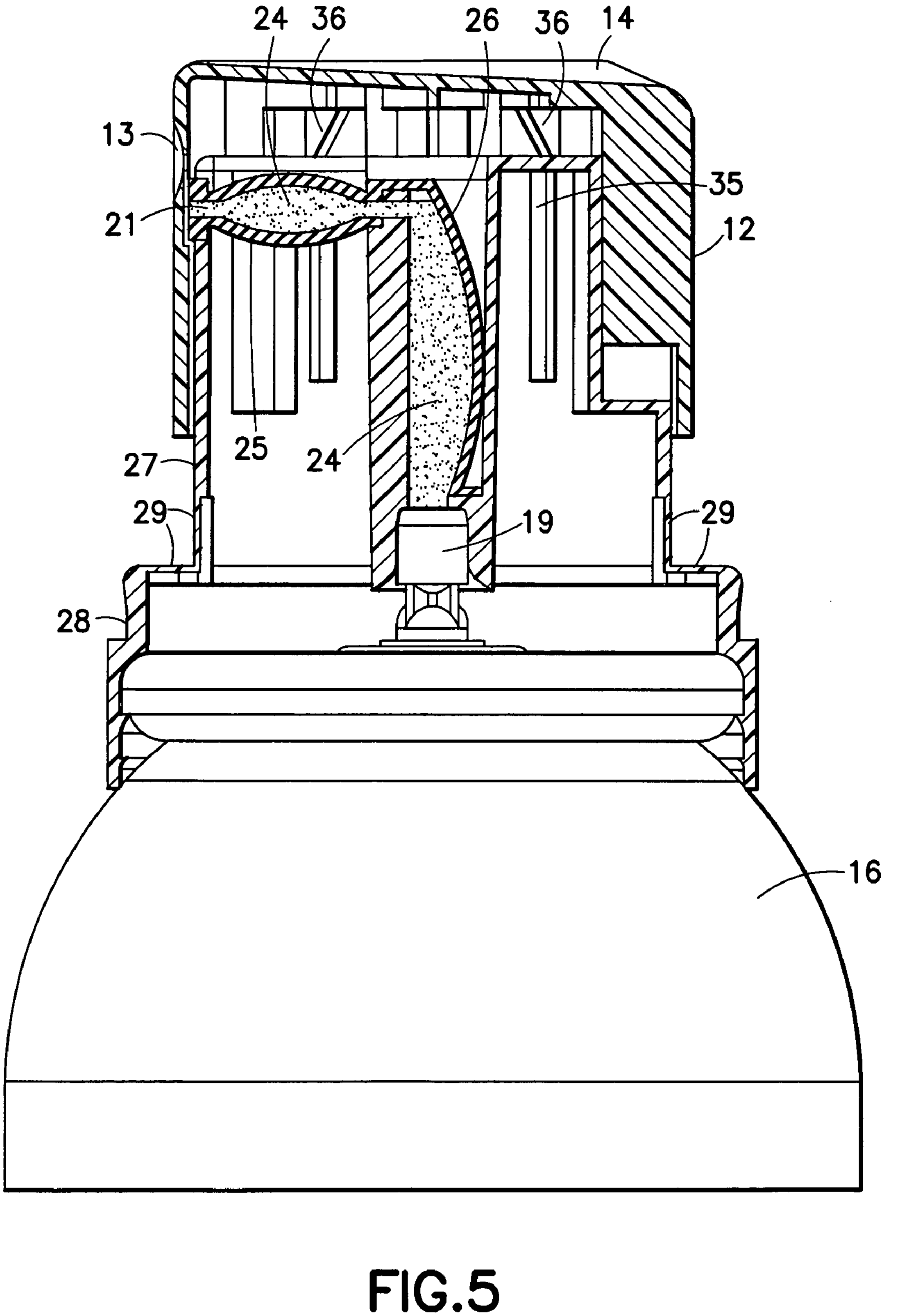
FIG. 5 is an axial cross-sectional view corresponding to FIG. 2 and showing the assembled actuator in its post-dispensing, shut-off phase.

When the user's finger is released from the top surface 14 of cap 12 to cease product dispensing, the condition and relationships shown in FIG. 5 now occur. The conventional aerosol spring (not shown) raises valve stem 19 back upwardly so that base upper portion 27 is raised back upwardly in relation to base lower portion 28, and tab hinges assume again the position shown in FIG. 2. Further, cap 12 now rises upwardly in relation to base 11 under an action described in detail hereafter. Cap and base product dispensing opening 13,21 again become misaligned, and the product conduit tube 25 again becomes sealed at its outer open end 32 by the inner surface of the cap wall.

FIG. 5 illustrates a primary feature of the present invention, in that after dispensing of a foaming product when the aerosol valve is shut off, product conduit 24 is sealed and the post-foaming action of the product is take up by the expansion of product conduit 24 by virtue of its flexible, expandable nature due to the soft TPE material defining the conduit. No post foaming of the product occurs outside of cap opening 13, and unsightly, unsanitary and messy product outside and adjacent the actuator dispensing opening is eliminated. When the next dispensing operation occurs, the foamed product in expanded conduit 24 is forced out of the outlet openings 13,21 by new product from container 16.

Cap 12 slides upwardly on base 11 after product dispensing has ceased by a combination of features. More specifically, referring to FIGS. 6-11, the side wall of base upper portion 27 has a plurality of inwardly flexible members 35, and cap 12 has a plurality of corresponding ramps 36. When cap 12 is slid downwardly on base 11 under normal pressure, ramps 36 are positioned in cap 12 so as to flex said flexible members 35 inwardly toward the central axis of base upper portion 27 (see FIGS. 2-4). After product dispensing when cap 12 is no longer being pressed downwardly by the user, flexible members 35 seek to flex back outwardly and in so doing act against corresponding ramps 36 to cause the sliding return of cap 12 back up to its FIG. 5 non-actuated position.

Figure 10:
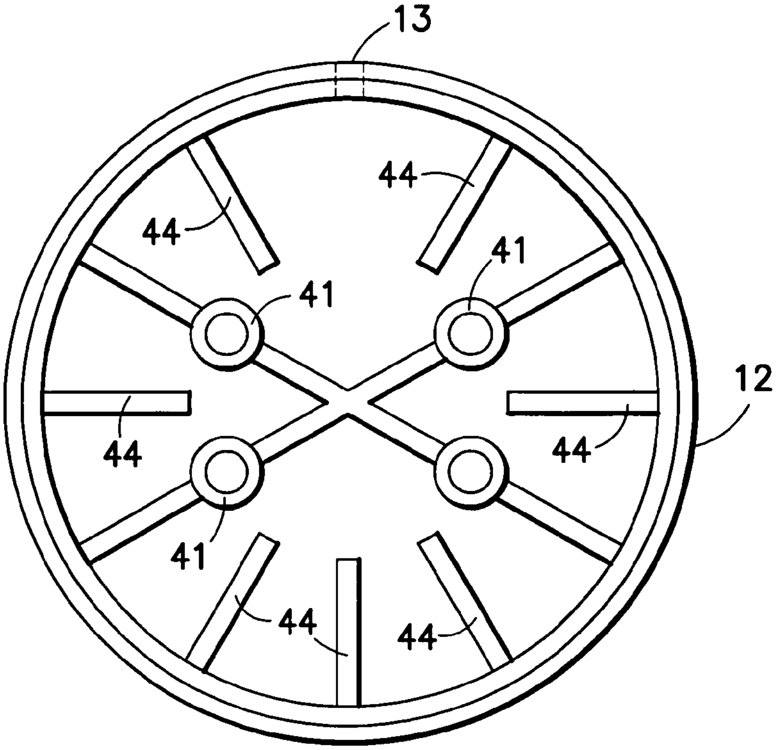
FIG. 10 is a bottom plan view of the cap of the aerosol valve actuator of the present invention.
Figure 11:
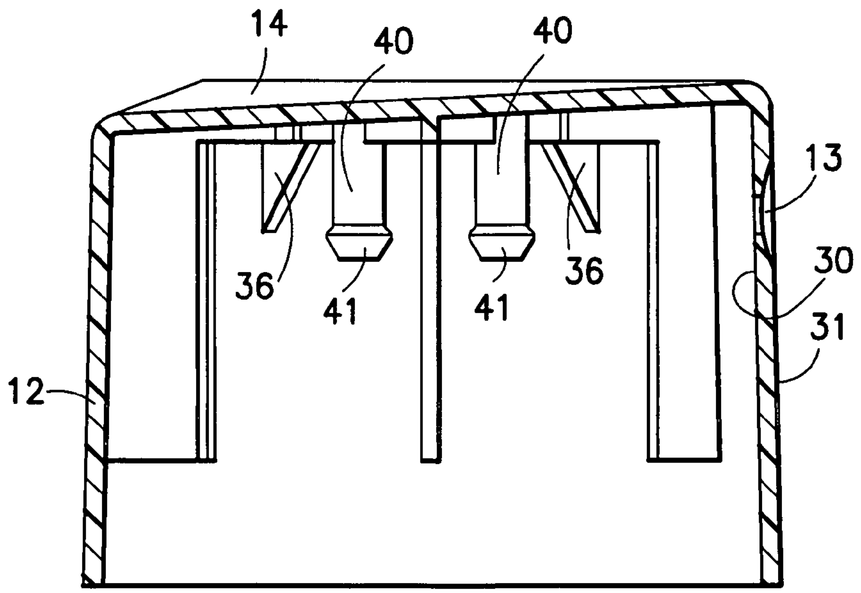
FIG. 11 is an axial cross-sectional view of the cap of the aerosol valve actuator of the present invention.

To facilitate the assembly and operation of base 11 and cap 12, the underside of the cap top surface 14 has a plurality of protrusions 40 with enlarged knobs 41 on the ends thereof (FIGS. 10 and 11). In turn, base upper portion 27 has in its top wall a corresponding plurality of holes 42 (FIGS. 6,7,8) through which knobs 41 are forced and protrusions 40 extend. Protrusions 40 slide through holes 42 as cap 12 slides up and down on upper base portion 27, and knobs 41 keep these parts from separating. Upper base portion 27 also has a plurality of sidewall slots 43 within which fit and slide cap inner wall protuberances 44 (see FIG. 10) to align and stabilize cap 12 in one position with respect to base 11 upon assembly.

The features of the present invention described above together define a unique aerosol valve actuator which eliminates the post-foaming problem, is strongly constructed, is easily manufactured and assembled, and functions reliably and aesthetically in a sanitary manner for the consumer.

It will be appreciated by persons skilled in the art that variations and/or modifications may be made to the present invention without departing from the spirit and scope of the invention. The present embodiment is, therefore, to be considered as illustrative and not restrictive. It should also be understood that positional terms as used in the specification are used and intended in relation to the normal positioning shown in the drawings, and are not otherwise intended to be restrictive.

What is claimed is:

1. A method of forming an aerosol valve actuator, said actuator having an aerosol valve stem engaging portion, a product dispensing opening that can be opened and closed, and a flexible and expandable product conduit extending between said valve stem engaging portion and said product dispensing opening, comprising molding said flexible and expandable product conduit at least in part of a first plastic material and molding the remainder of the actuator of a second plastic material, said first plastic material being softer than said second plastic material, further comprising first molding said remainder of the actuator and thereafter overmolding the first plastic material onto the second plastic material to form at least a part of said flexible and expandable product conduit.

2. A method of forming an aerosol valve actuator, said actuator having an aerosol valve stem engaging portion, a product dispensing opening that can be opened and closed, and a flexible and expandable product conduit extending between said valve stem engaging portion and said product dispensing opening, comprising:

molding a centrally located tube of a first plastic material to form a first part of a vertical portion of said flexible and expandable product conduit; and overmolding a second plastic material onto the first plastic material to form a second part of said vertical portion of said flexible and expandable product conduit and to form a horizontal portion of flexible and expandable product conduit, said second plastic material being softer than said first plastic material so that said second part of said vertical portion and said horizontal portion are expandable.

3. The method of claim 2, wherein said first part of said vertical portion comprises a curvilinear member and said horizontal portion comprises a tubular member.

4. The method of claim 2, wherein said first plastic material comprises a thermoplastic elastomer and said second plastic material comprises polypropylene.

* * * * *